United States Patent
Rohrbach et al.

[11] Patent Number: 5,902,384
[45] Date of Patent: May 11, 1999

[54] WICKING FIBER WITH SOLID PARTICULATES FOR A HIGH SURFACE AREA ODOR REMOVING FILTER AND METHOD OF MAKING

[75] Inventors: Ronald Rohrbach, Hunterdon; Lixin Xue; Daniel Bause, both of Morristown; Peter Unger, Convent Station; Russell Dondero, N. Arlington, all of N.J.; Gordon Jones, Toledo, Ohio

[73] Assignee: AlliedSignal Inc., Morristown, N.J.

[21] Appl. No.: 08/956,549

[22] Filed: Oct. 23, 1997

Related U.S. Application Data

[63] Continuation-in-part of application No. 08/736,308, Oct. 24, 1996, Pat. No. 5,713,971, which is a continuation of application No. 08/363,500, Dec. 23, 1994, abandoned.

[51] Int. Cl.[6] ........................................ B01D 47/00
[52] U.S. Cl. ................. 96/296; 55/DIG. 5; 261/104; 264/257; 264/271.1; 264/DIG. 48
[58] Field of Search ................. 261/104, 107, 261/99, 80, 94, DIG. 17, DIG. 65; 55/302, 303, DIG. 5; 96/290, 294, 296, 181, 143, 144, FOR 123, FOR 124; 95/210–212, 159, 170, 171; 428/397, 398; 264/259, 241, 271.1, 273, 279, 279.1, 257, DIG. 48

[56] References Cited

U.S. PATENT DOCUMENTS

| | | | |
|---|---|---|---|
| 1,273,682 | 7/1918 | Slater et al. | 261/104 |
| 2,085,390 | 6/1937 | Quinlivan | 261/104 |
| 2,603,468 | 7/1952 | Sutton | 261/104 |
| 2,653,017 | 9/1953 | Frost | 261/104 X |
| 3,505,175 | 4/1970 | Zalles | 261/80 X |
| 3,754,377 | 8/1973 | Clonts | 95/211 |
| 3,888,955 | 6/1975 | Maruko | 261/104 X |
| 3,911,724 | 10/1975 | Geiser | 261/99 X |
| 4,031,180 | 6/1977 | Bohanon | 261/106 |
| 4,086,305 | 4/1978 | Dobritz | 261/104 X |
| 4,098,852 | 7/1978 | Christen et al. | 261/104 |
| 4,102,656 | 7/1978 | Koritz | 261/107 X |
| 4,130,487 | 12/1978 | Hunter et al. | 55/521 X |
| 4,166,087 | 8/1979 | Cline et al. | 261/DIG. 17 |
| 4,300,925 | 11/1981 | Nikandrov et al. | 96/130 |
| 4,323,373 | 4/1982 | Fritz | 95/281 |
| 4,578,091 | 3/1986 | Borja | 95/214 |
| 4,774,032 | 9/1988 | Coates et al. | 261/104 |
| 4,938,787 | 7/1990 | Simmerlein-Erlbacher | 96/298 |
| 4,976,113 | 12/1990 | Gershuni et al. | 261/104 X |
| 5,024,686 | 6/1991 | Lerner | 96/361 |
| 5,057,368 | 10/1991 | Largman et al. | 428/397 |
| 5,110,325 | 5/1992 | Lerner | 95/213 |
| 5,310,416 | 5/1994 | Borger et al. | 95/64 |
| 5,318,731 | 6/1994 | Yokoya et al. | 261/104 |
| 5,472,613 | 12/1995 | Schofield | 210/634 |
| 5,704,966 | 1/1998 | Rohrbach et al. | 95/170 |
| 5,713,971 | 2/1998 | Rohrbach et al. | 261/104 X |

FOREIGN PATENT DOCUMENTS 0 600 331 A1  6/1994  European Pat. Off. .

*Primary Examiner*—Richard L. Chiesa

[57] ABSTRACT

A unique filtration device (10) which continuously removes gas phase contaminants from an air stream through the use of partially hollow wicking fibers (20) impregnated with a fine solid powder and a selected chemisorptive liquid (18) which can capture the gas phase contaminants. The wicking fibers (20) are generally disposed to extend in the same direction and are formed into a filter element (12). The air stream to be cleaned is directed through filter element (12). The wicking fibers (20) include internal longitudinal cavities (22) filled with a fine powder and each having a relatively small longitudinal extending opening (24). The wicking fibers (20) are filled with the selected contaminant removing chemisorptive liquid through capillary action by which the individual wicking fibers (20) rapidly draw the selected chemisorptive liquid, with which they come into contact, through the internal cavities (22). The chemisorptive liquid and fine powder remains within the wicking fiber cavities (22) and generally does not enter the space between the wicking fibers yet through the longitudinal openings (24) the chemisorptive liquid is in full fluid communication with the air stream flowing past the fibers (20).

17 Claims, 4 Drawing Sheets

WICKING FIBER WITH SOLID PARTICULATES FOR A HIGH SURFACE AREA ODOR REMOVING FILTER AND METHOD OF MAKING

CROSS-REFERENCES TO RELATED APPLICATIONS

This application is a continuation-in-part of U.S. patent application Ser. No. 08/736,308 titled "A Filtration Device Using Absorption for the Removal of Gas Phase Contamination" filed Oct. 24, 1996, now U.S. Pat. No. 5,713,971, which is a continuation of now abandoned U.S. patent application Ser. No. 08/363,500 titled "A Filtration Device Using Absorption for the Removal of Gas Phase Contamination" filed Dec. 23, 1994 and assigned to the assignee of the present application.

BACKGROUND OF THE INVENTION

1. Field of the Invention

This invention relates to an air cleaning system and more particularly to an odor removal system using wicking fibers incorporating a dry fine solid powder with chemisorptive reagents.

2. Description of Prior Art

An example of an adsorptive technique for the removal of odors is the use of activated charcoal as an odor removing element in a device to purify an air stream. U.S. Pat. No. 4,130,487 shows a filter for liquid or gases which includes activated carbon for removing odors during air filtration. The activated carbon is in an additional layer which is added to the filter material.

Conventional carbon adsorbents have a broad range of effectiveness against odors. However, such activated carbon adsorptive techniques of removing odor from an air stream are effective only for a relatively short time period, are relatively inefficient at low odor concentration levels, have performance which declines rapidly at higher relative humidities, and frequently result in a relatively high pressure differential across the activated carbon filter element. As a result relatively large quantities of activated carbon are required in such filter devices, however, even with the larger amount of activated carbon the relatively large pressure differential problem will still remain. These prior devices are usually operated mechanical on a cyclic bases.

It is desirable to provide a compact, economical air filter for the continuous removal of odors which avoids the problems of reduced flow rates, reduced efficiency at high humidities, and reduced removal efficiency over time.

SUMMARY OF THE INVENTION

The present invention provides a unique filtration device which continuously removes odor contaminants from an air stream through the use of a wicking fiber material containing in its channels a very fine solid powder and a selected chemisorptive agent package effective at removing a wide range of odors. The basic liquid chemisorptive agent contains sodium permanganate in combination with sodium carbonate or sodium phosphate into which other reagents can be added for additional odor removal capabilities.

Wicking fibers such as those disclosed in U.S. Pat. No. 5,057,368 are very small and well suited to the practice of the present invention. These generally hollow wicking fibers include internal longitudinal cavities each with a longitudinal opening extending to the outer fiber surface. The fiber, the opening size and the particles to be entrapped are selected so that when the particles are forced into the longitudinal cavities they are permanently retained. The fibers selected provide a way to mechanically immobilize a fine powder. The small solid particles become mechanically trapped within the longitudinal cavities of the fibers and are basically irreversible bound. This approach can be extended to any powder which one would like to entrap within a fiber medium, including such agents as carbon, zeolites, baking soda, cyclodextrins, PTFE, or any number of other solid particle of interest. After the very fine solid particles are entrapped the wicking fiber is impregnated with a liquid chemisorptive agent. We have found that incorporating very fine powders into the channels of the wicking fibers increases the overall filtrating performance of the media when impregnated with a liquid chemisorptive agent.

Wicking fibers have the ability to carry a liquid along their surface and to retain the liquid so it is not easily dislodged. Through capillary action the individual wicking fibers rapidly draw the selected liquid, with which it comes into contact, through the internal cavities. The chemisorptive liquid remains within the wicking fiber cavities and generally does not enter the space between the wicking fibers yet through the longitudinal openings the liquid is in cormnunication with the air stream flowing past the wicking fibers.

Undesirable odors and toxic gas molecules are removed from the air stream by interposing a plurality of the wicking fibers which include in their internal cavities the fine solid powder particles and the disclosed liquid chemisorptive agent which has an affinity for the undesired odor and gas molecules. The longitudinal extending opens in the wicking fibers permits the liquid surrounding the fine powder which is retained in the wicking fiber cavities to interact with the air stream so as to capture the unwanted odor vapors and noxious gas molecules.

In one embodiment of the invention a concentration factor induced molecular migration effectively conveys the undesirable odor and/or toxic gas molecules within the liquid chemisorptive agent away from the air stream to be cleaned, setting up a steady state concentration gradient with new odor and/or toxic gas molecules continuously being absorbed.

This invention can be use in a customized fashion to remove specific odors and toxic gases. Since this filter does not rely on adsorption, wherein particles to be removed attach to the surface of the filter material elements, but rather absorption, molecular motion mobility can be harnessed to move unwanted gases from one zone to another in a nonmechanical manner. In the disclosed device the open space between the wicking fibers remain so that, in the air stream to be cleaned, the pressure differential problem is minimized and air flow restrictions are not increased by continuous use of the fine particles with the chemical reagent liquid package and the odor vapors which are absorbed. A device according to the present invention provides for nonmechanical and continuous noncyclic regeneration or cleaning of a gas stream.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
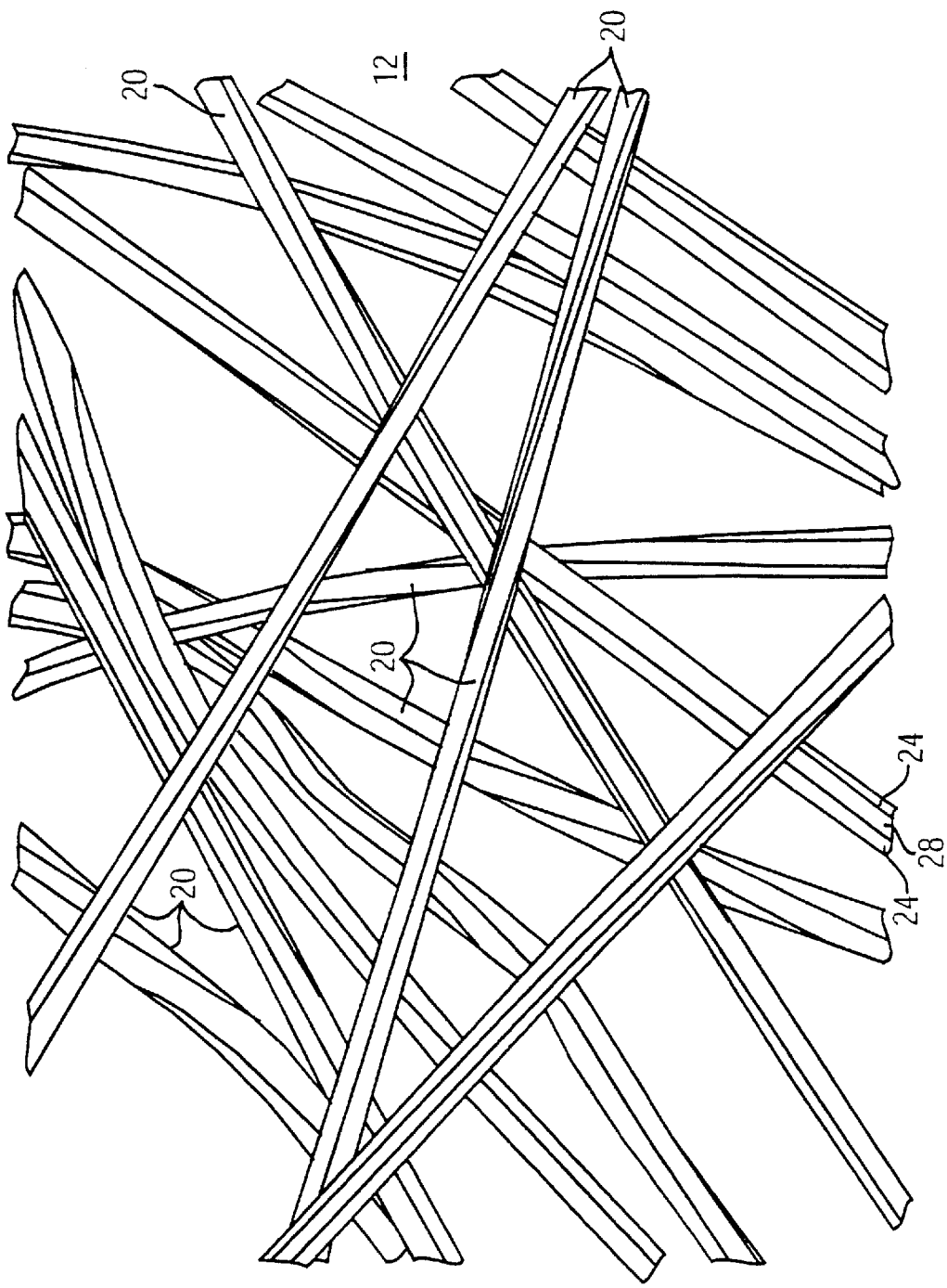
FIG. 1 is an illustration of a portion of a nonwoven fiber mat utilizing wicking fibers which can be impregnated with fine powder particles and a liquid chemisorptive agent according to the present invention.
Figure 2:
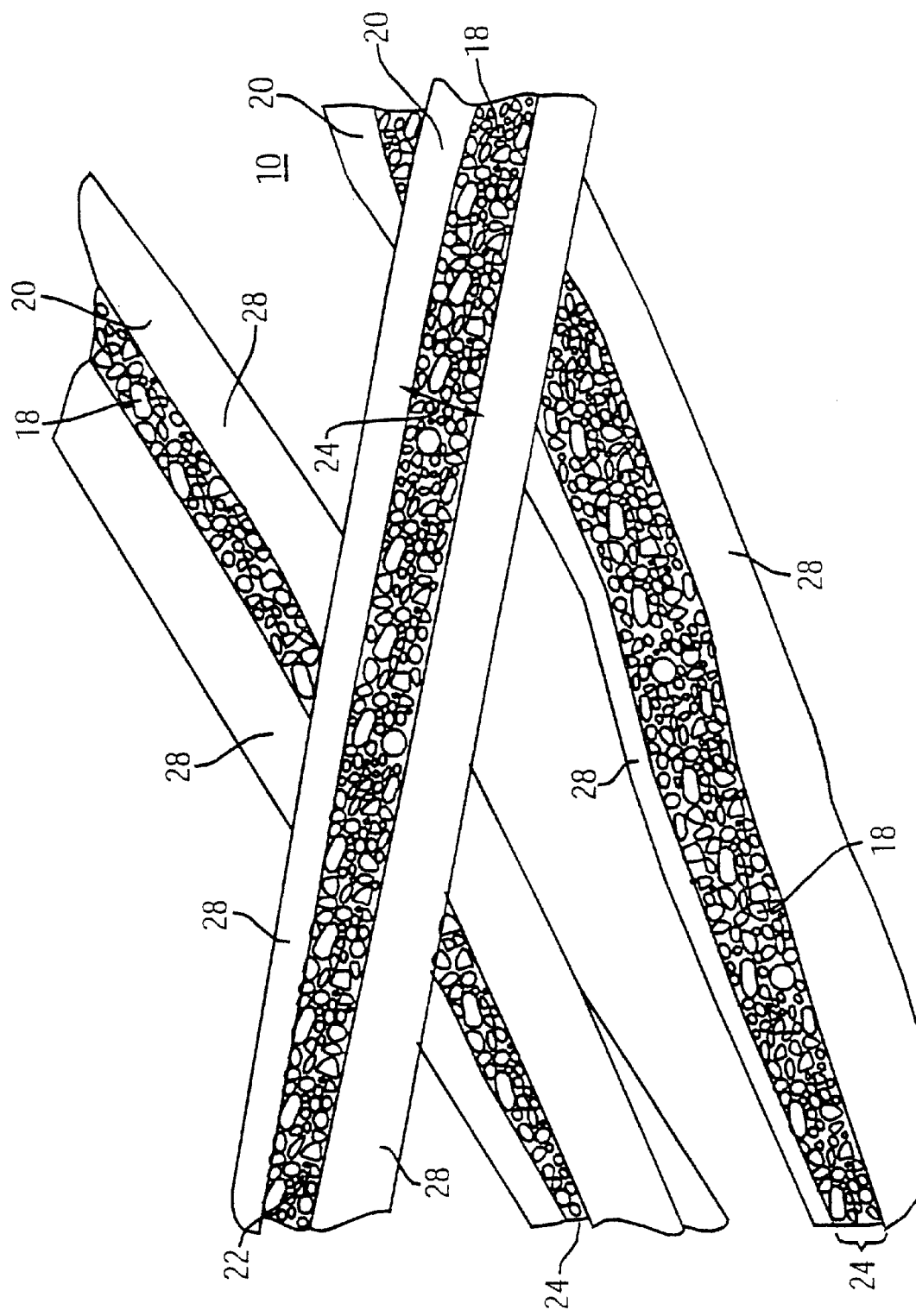
FIG. 2 is an enlarged view of a portion of the fiber mat shown in FIG. 1 utilizing wicking fibers containing the fine powder particles and a liquid chemisorptive agent according to the present invention.
Figure 5:
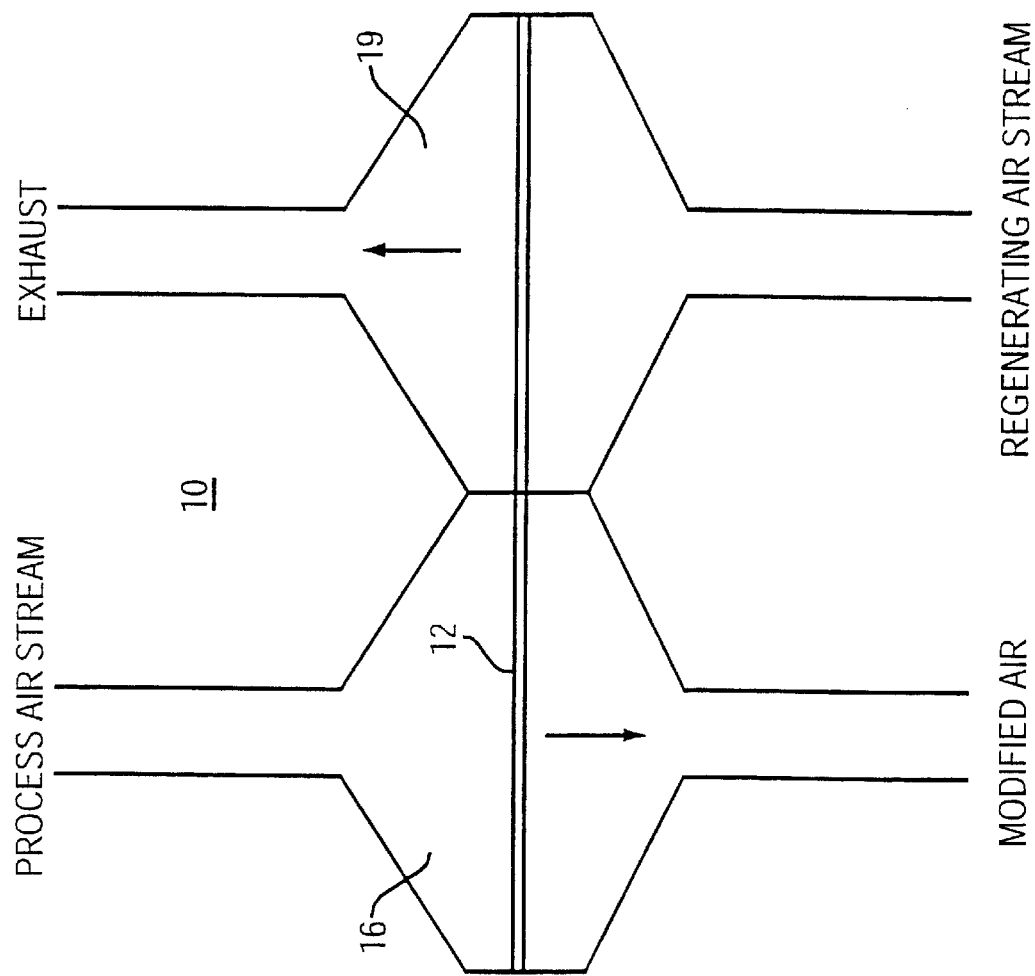

Referring now to the drawings and FIGS. 1, 2 and 5 in particular there is shown a continuous odor removal system 10 according to the present invention. Odor removal system 10 utilizes a filter element 12 formed from numerous wicking fibers 20, of the type shown in FIG. 3, containing numerous fine powder particles and an odor absorbing chemical reagent liquid 18 according to the invention.

The fine particles and odor absorbing liquid 18 contains sodium permanganate in combination with sodium carbonate or sodium phosphate into which other reagents can be added for additional odor removal capabilities. The fine particles and odor absorbing liquid 18 which has an affinity for specific odors is selected and disposed within internal channels or cavities 22 formed in the individual wicking fibers 20. The liquid media selected 18 uses absorption rather than adsorption as its mechanism to decontaminate or purify the air stream. The absorption liquids used are selected to absorb the odor vapors of interest. The chemical reagent liquid should be capable of lightly absorbing a particular odor molecule in a reversible manner so that it can be easily stripped off.

Figure 3:
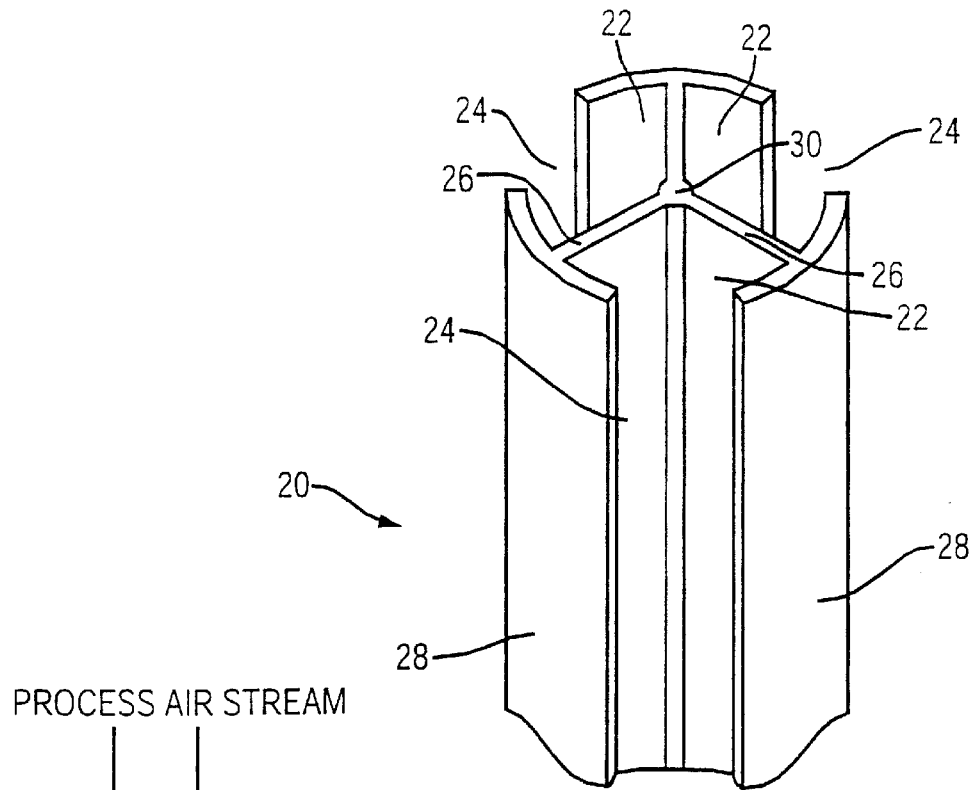
FIG. 3 is a perspective view showing a wicking fiber which is suitable for practicing the present invention.

A wicking fiber which is particularly suitable for practicing this invention is disclosed in U.S. Pat. No. 5,057,368. This patent discloses a trilobal or quadrilobal fiber formed from thermoplastic polymers wherein the fiber has a cross-section with a central core and three or four T-shaped lobes 26. The legs of the lobes intersect at the core so that the angle between the legs of adjacent lobes is from about 80 degrees to 130 degrees. The thermoplastic polymer is typically a polyamide, a polyester, a polyolefin or a combination thereof. The wicking fiber as illustrated in FIG. 3 is formed as an extruded strand having three hollow interior longitudinally extending cavities 22 each of which communicates with the outer strand surface by way of longitudinal extending slots 24. The wicking fibers 20 are relatively small having a diameter of 30 to 250 microns. The width of the longitudinal extending slots 24 is normally less than one half of the diameter of fibers 20. The fiber 20, the opening size and the particles to be entrapped are selected so that when the particles are forced into the longitudinal cavities 24 they are permanently retained. The small solid particles becomes mechanically trapped within the longitudinal cavities 24 of the fibers 20 and are basically irreversible bound. This approach can be extended to any powder which one would like to entrap within a fiber medium, including such agents as carbon, zeolites, baking soda, cyclodextrins or any number of other solid particle of interest. After the fine solid particles are entrapped the wicking fiber is impregnated with a liquid chemisorptive agent.

The capillary forces within the individual cavities 22 are so much greater than those external to the fiber 20 that the chemisorptive liquid agent is readily wicked up the interior of the fiber 20 without appreciable wetting of the external surfaces 28 or filling the inter fiber voids. The fibers 20 strongly retain the liquid through capillary action so that the fiber mat 12 is not wet to the touch and the liquid will not shake off. In a filter mat 12 of such wicking fibers 20 the area between the individual strands remains relatively free of the fine particles and chemisorptive gas absorbing liquid 18 with which the internal cavities 22 of each fiber 20 are filled. The filter element may be made of one or more type of wicking material strands such as polyamide, polyester, or polyolefins. The three T-Shaped cross-section segments may have their outer surface 28 curved, as shown, or straight. While the wicking fiber 20 is depicted as three lobed other number of lobes are suitable. In addition other internal wicking fibers may be used such as a C-shaped fiber. Other shaped cross sections may also be suitable for wicking the odor extracting liquid. The odor contaminated air stream is directed over the filters 12 formed from the wicking fibers 20 into contact with the fine particles and odor extracting liquid 18 and the contaminating odor vapors are absorbed into the odor extracting liquid through the openings 24.

The specific shape of the wicking fibers is not important so long as the fibers selected can move the chemisorptive liquid, with which it comes into contact, along its surface and then hold the chemisorptive liquid to its surface so that it is not easily displaced.

Many common materials which are effective wicking agents may restrict circulation of air through the material. For example, wetting a common handkerchief with water essentially seals the material against air flow there through. By using internal wicking fibers where the odor absorbing liquid is maintained within the cavities 22 of fiber 20 unrestricted air flow about the outside of the individual wicking fibers 20 is maintained.

The present invention provides a convenient approach to increase the reaction surface area in wicking fiber filter impregnated with a chemisorptive reagent which translates into better and higher efficiency in filtration. A problem with odor control filters is their very low residence times typical of thin panel filters. Also, the reaction surface area has been a limitation on gas phase removal absorbent or adsorbent filters. Traditionally, the kinetics have been greatly limited by the available fiber surface morphology and geometry. In odor removal filter we have used the wicking fibers to disperse chemisorptive agents in a high surface area format. We have discovered improved filter performance due to a significant increase in reaction surface area caused by incorporating a dry fine solid powder in the wicking fiber channels along with the chemisorptive reagents. This has further increased the performance of the filters.

Figure 4:
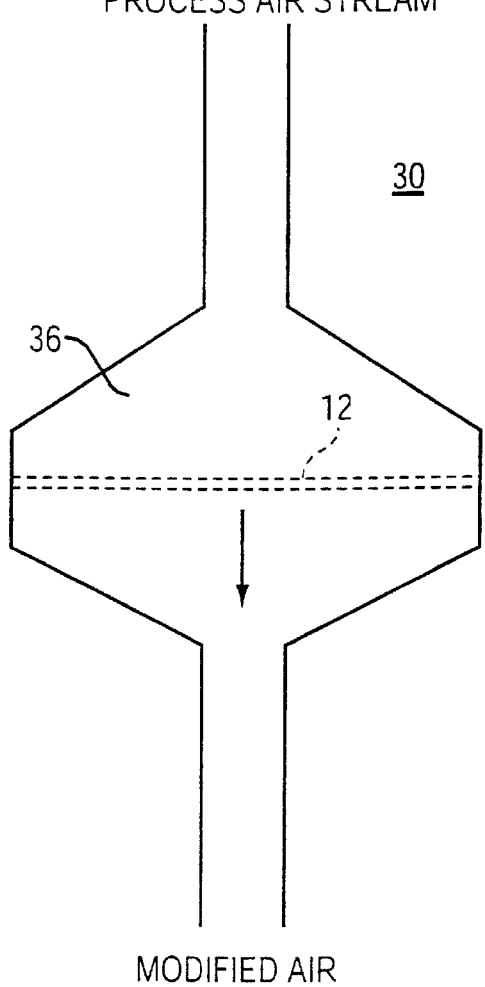
FIG. 4 is an illustration of an odor control filter system using a fiber mat as shown in FIG. 2 impregnated with the fine powder particles and a liquid chemisorptive agent; and, FIG. 5 is a diagrammatic illustration of another odor removal filter device using wicking fibers with fine powder particles and a liquid chemisorptive agent according to the present invention.

Referring now to FIG. 4 there is shown a diagrammatic illustration of odor removal device 30 according to the present invention. Device 30 includes a filter 12 formed of fibers 20 with fine powder particles and an odor extracting liquid 18 disposed in the fiber channels 22. The disclosed odor removal system 30 includes an odor removal chamber 36. The fiber mesh or filter element 12 consists of numerous wicking fibers 20 disposed and oriented to extend across chambers 36. The odor contaminated air stream to be cleaned enters chamber 36 and is directed through the impregnated fiber mesh 12 which is disposed across chamber 36. All of the odor contaminated air stream through chamber 36 must flow through the wicking fiber mesh 12. Fiber mesh 12 is constructed with many wicking fibers 20 impregnated with the fine powder and chemisorptive odor extracting liquid 18 and has sufficient thickness so that the entire air stream flowing through chamber 36 comes into intimate contact with the selected liquid 18 within the cavities 22 of the wicking fibers 20. The selected fine powder and chemisorptive liquid 18 which has an affinity for the undesired odor molecules absorbs the odor molecules and thus removes them from the contaminated air stream flowing through chamber 36. Filter 12 can be changed periodically before it starts to become ineffective in odor removal.

Referring now to FIG. 5 there is shown a diagrammatic illustration of another odor removal device 10 according to the present invention. Device 10 includes a filter 12 formed of fibers 20 with fine powder particles and a chemisorptive odor extracting liquid 18 disposed in the channels 22. The disclosed odor removal system 10 includes an odor removal chamber 16 and a stripping or cleaning chamber 19. The fiber mesh or filter element 12 consists of numerous wicking fibers 20 disposed and oriented to extend within both chambers 16, 19. A housing (not shown) can be formed around the outside of the device 10. The odor removal system 10 is constructed so that the two chambers 16, 19 are separate. A partition within device 10 separates chamber 16 from chamber 19. The odor contaminated air stream to be cleaned enters chamber 16 and is directed through the portion of the impregnated fiber mesh 12 which is disposed across chamber 16. All of the odor contaminated air stream through chamber 16 must flow through the wicking fiber mesh 12. Fiber mesh 12 is constructed with many wicking fibers 20 impregnated with the fine powder and chemisorptive odor extracting liquid 18 and has sufficient thickness so that the entire air stream flowing through chamber 16 comes into intimate contact with the selected liquid 18 within the cavities 22 of the wicking fibers 20. The selected fine powder and chemisorptive liquid 18 which has an affinity for the undesired odor molecules absorbs the odor molecules and thus removes them from the contaminated air stream flowing through chamber 16.

The wicking fibers 20, containing the chemisorptive liquid with the absorbed unwanted odor molecules, extends into a stripping or cleaning chamber 19 wherein a regenerating air stream passes over the wicking fibers 20 and strips and carries away the unwanted odor molecules. A concentration factor induced molecular migration effectively conveys the undesirable molecules within the chemisorptive liquid from the air stream to be cleaned within chamber 16 into the stripping air stream flowing through chamber 19. The stripping air stream may be heated or otherwise modified to facilitate removal of the undesirable odor causing molecules. The direction of flow of the air streams flowing through chambers 16 and 19 is not important. The size of chambers 16 and 19 and the flow rates of the air streams can be designed to suit a particular application. The selected chemisorptive liquid acts as a shuttling carrier capable of transporting gases across the partition to the stripping chamber 19 and returning again via the generally parallel arrangement of fibers 20. A concentration factor induced molecular migration effectively conveys the undesirable odor causing molecules within the liquid odor extractant away from the contaminated air stream to be cleaned in chamber 16, setting up a steady state concentration gradient with new odor molecules continuously being absorbed within the supported liquid odor extractant.

The method of operation and the apparatus of this invention should now be clear. Undesirable air borne odor contaminants are removed from an air stream by interposing a plurality of at least partially hollow wicking fibers 20 in the air stream. The hollow portions 22 of the wicking fibers contain a fine powder and chemisorptive liquid 18, including a component having an affinity for the undesirable odor molecules, which communicates with the air stream through an opening 24. The undesirable odor molecules are absorbed by the fine powder and chemisorptive liquid 18 within the wicking fibers 20. The undesirable odor molecules in solution within the chemisorptive liquid are then conveyed from the cleaned air stream by a concentration factor induced molecular migration into a regenerating air stream.

The wicking fiber approach of the present invention has significant advantages over the use of dry activated carbon. The impregnated wicking fibers 20 can have an extremely high odor absorbing capacity, many times greater than activated carbon. The pressure drop across an air filter 10 is much smaller than the drop across an activated carbon filter for the same capacity and removal efficiency. The wicking fiber filter 10 can be impregnated with additional additives to the basic chemical reagent liquid package to remove a broader range of gases than activated carbon. Further, the wicking fiber odor filter system 10 will not deteriorate in a high humidity environment. The wicking fiber systems 10, operating in a steady state condition, provides for the continuous removal of selected gas molecules and does not require a pump or other device to move the gas chemisorptive liquid.

The chemisorptive wicking fiber filter 12 has odor reducing properties superior to granular activated carbon. Additionally activated carbon's performance declines rapidly at higher relative humidities. The disclosed chemical formulation has properties which are improved when the relative humidities are higher. Additionally, prior art chemical reagent packages usually rely on solid coated substrate with their chemical package. This means that the reagent package is in the dry state. Typically dry reagents have slower kinetics than liquid based reagents. We have found a chemical composition liquid including sodium permanganate in combination with either sodium carbonate or sodium phosphate has a wide and broad spectrum of effectiveness for odor removal. The fine powder and chemisorptive odor absorbing liquid 18 can include specialized additives such as transition metal salts and other agents such as sodium iodide for additional and broader odor removal coverage.

The present invention is particularly suited to cabin air odor filtration. The disclosed invention provides a compact, economical air filter 10 for the nonmechanical, noncyclic, continuous removal of odor causing gas molecules which avoids the problems of reduced air flow rates and decreased molecule removal efficiency.

We claim:

1. A filter using a fiber mat for removal of molecules from a fluid stream comprising:
   a plurality of elongated fibers each having a longitudinally extending internal cavity including an opening from the internal cavity to the outer fiber surface;
   a fine powder made from particles which are smaller than the opening disposed within the internal cavities of said plurality of elongated fibers;
   said fine powder particles being of such a size, shape and makeup that they are securely retained within the internal cavity; and,
   a liquid chemisorptive agent having an affinity for the molecules to be removed from the fluid stream also disposed within the internal cavities of said plurality of elongated wicking fibers.

2. A filter as claimed in claim 1 wherein each elongated fiber is less than 250 microns in diameter and the majority of fine powder particles are less than 20 microns in size.

3. A filter as claimed in claim 1 wherein the longitudinally extending internal cavity in each of said plurality of elongated fibers is sized so that said liquid chemisorptive agent is retained within the cavity by capillary forces.

4. A filter as claimed in claim 1 wherein a plurality of internal cavities, each including an opening to the outer fiber surface, are formed in each fiber.

5. A filter as claimed in claim 1 wherein the diameter of said elongated fibers is less than 250 microns, the width of said elongated opening is less than one half the strand diameter and the average diameter of said plurality of solid particles is less than 10 microns.

6. A filter as claimed in claim 1 wherein said liquid chemisorptive agent comprises sodium permanganate in combination with either sodium carbonate or sodium phosphate.

7. A filter for removing a selected type of odor molecules from an air stream comprising:

- a plurality of elongated fibers, each having an elongated open channel extending into the interior of the fiber, disposed to form a fiber filter mat;
- a fine powder disposed within the elongated open channels of said plurality of elongated fibers; and,
- a liquid chemisorptive agent which has an affinity for the selected type of odor molecules to be removed from the air stream also disposed within the elongated open channels and having an exposed portion near the exterior of the fiber for absorbing the selected types of odor molecules as the air stream passes through the filter.

8. A device for continuously removing undesirable odor vapors from a first air stream and releasing them into a second air stream comprising:

- a plurality of wicking fibers each including a longitudinally extending channel with a longitudinally extending opening;
- a fine powder disposed within the longitudinally extending channels of said plurality of wicking fibers;
- a liquid chemisorptive agent having an affinity for the undesirable odor vapors disposed within the longitudinally extending channels of said plurality of wicking fibers;
- means for directing the first air stream across a part of said plurality of wicking fibers into contact with said liquid chemisorptive agent along said longitudinally extending openings whereby said liquid chemisorptive agent absorbs the undesirable odor vapors; and,
- said plurality of wicking fibers disposed to extend from the first air stream into the second air stream which strips away the undesirable odor vapors.

9. A device for continuously removing undesirable odor vapors as claimed in claim 8 wherein each elongated wicking fiber is less than 250 microns in diameter and the majority of fine powder particles are less than 20 microns in size.

10. A device for continuously removing undesirable odor vapors as claimed in claim 8 wherein the longitudinally extending internal cavity in each of said plurality of elongated fibers is sized so that said liquid chemisorptive agent is retained within the cavity by capillary forces.

11. A device for continuously removing undesirable odor vapors as claimed in claim 8 wherein a plurality of internal cavities, each including an opening to the outer fiber surface, are formed in each fiber.

12. A device for continuously removing undesirable odor vapors as claimed in claim 8 wherein the diameter of said elongated fibers is less than 250 microns, the width of said elongated opening is less than one half the strand diameter and the average diameter of said plurality of solid particles is less than 10 microns.

13. A device for continuously removing undesirable odor vapors as claimed in claim 8 wherein liquid chemisorptive agent comprises sodium permanganate in combination with either sodium carbonate or sodium phosphate.

14. A method of manufacturing a fiber strand impregnated with solid particles and a liquid chemisorptive agent for a filter comprising the steps of:

a. forming a fiber strand with an internal longitudinally extending cavity having a longitudinally extending opening, smaller than the cavity width, extending from the cavity to the fiber strand outer surface;

b. applying a plurality of solid particles to the strand;

c. forcing many of the solid particles into the internal longitudinally extending cavity where they are securely retained; and, d. bringing the fiber strand into contact with a liquid chemisorptive agent whereby the liquid chemisorptive agent is by capillary action drawn into the longitudinally extending cavity.

15. A method as claimed in claim 14 wherein the liquid chemisorptive agent comprises sodium permanganate in combination with sodium carbonate.

16. A method as claimed in claim 14 wherein the liquid chemisorptive agent comprises sodium permanganate in combination with sodium phosphate.

17. An air filtration system for removing gas phase contaminants comprising:

- a plurality of fibers each having at least one longitudinally extending open channel projection into the interior of the fiber;
- a plurality of small solid particles and a liquid chemisorptive agent which can adsorb the gas phase contaminants being disposed within the open channels in said plurality of fibers, and,
- an air flow path containing the gas phase contaminants directed over a portion of said plurality of fibers whereby said plurality of small solid particles and said liquid chemisorptive agent disposed in the open channels communicates with the air flow path and adsorbs the gas phase contaminants.

* * * * *